United States Patent [19]

Varnum et al.

[11] 4,453,559

[45] Jun. 12, 1984

[54] PNEUMATIC CONTROLLER

[75] Inventors: Gerald F. Varnum; David E. Wiklund, both of Marshalltown, Iowa

[73] Assignee: Fisher Controls Company, Inc., Marshalltown, Iowa

[21] Appl. No.: 312,930

[22] Filed: Oct. 19, 1981

[51] Int. Cl.³ .............................................. G05D 16/00
[52] U.S. Cl. ....................................... 137/85; 137/86
[58] Field of Search ............................. 137/85, 86, 82

[56] References Cited

U.S. PATENT DOCUMENTS

| | | |
|---|---|---|
| 2,776,670 | 1/1957 | Hunt . |
| 3,047,002 | 7/1962 | Jaquith . |
| 3,095,003 | 6/1963 | Dyson . |
| 3,354,895 | 11/1967 | Wisemann, Jr. . |
| 3,515,162 | 6/1970 | Bowditch et al. . |
| 3,572,360 | 3/1971 | Lloyd et al. . |

FOREIGN PATENT DOCUMENTS

| | | |
|---|---|---|
| 834663 | 11/1938 | France . |
| 1071770 | 9/1951 | France . |

*Primary Examiner*—Alan Cohan
*Attorney, Agent, or Firm*—Allegretti, Newitt, Witcoff & McAndrews, Ltd.

[57] ABSTRACT

A pneumatic process controller includes a nozzle mounted on a set point lever and a flapper with a connected process lever. The set point lever pivots the nozzle about a set point and input axis in response to set point adjustment. The process lever pivots the flapper about the same axis in response to the process variable. The nozzle and set point lever are mechanically separated from the flapper and process lever. Artificial effect upon the process variable from set point adjustment is eliminated.

12 Claims, 8 Drawing Figures

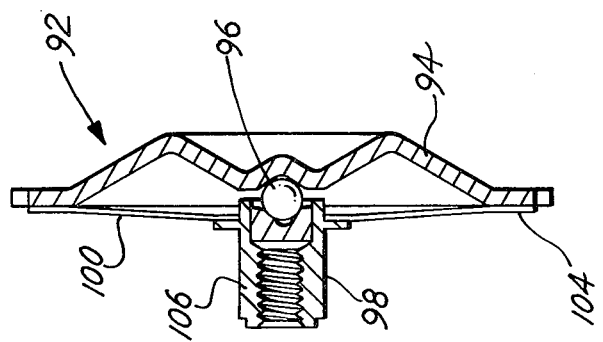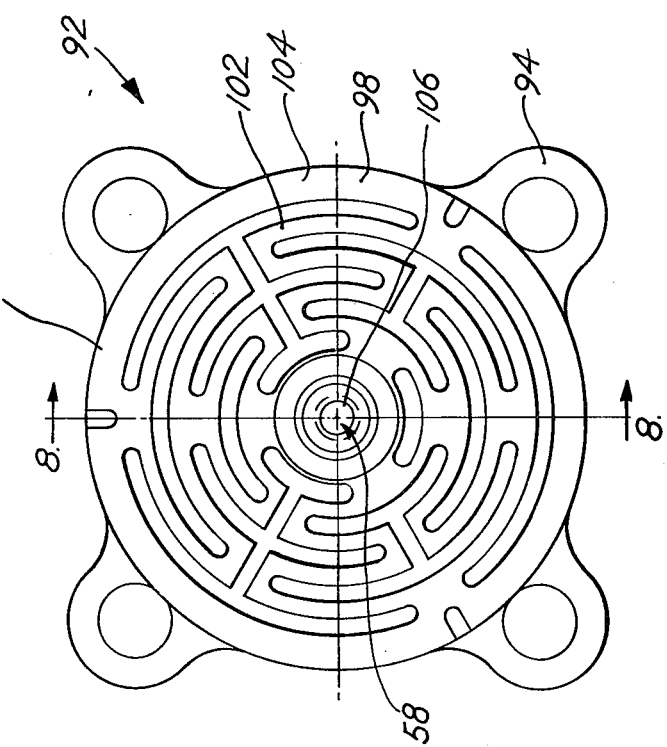

PNEUMATIC CONTROLLER

BACKGROUND OF THE INVENTION

This invention relates to process control apparatus, and more particularly, to an automatic, pneumatic controller of a process variable such as process pressure.

Prior to this invention, several automatic, pneumatic controllers have been disclosed and commercially used. U.S. Pat. No. 3,572,360 issued Mar. 23, 1971 to S. G. Lloyd et al. (incorporated by reference) discloses a prior pneumatic controller of Fisher Controls Co., Inc., while the following patents disclose controllers of others: U.S. Pat. No. 3,515,162 issued June 2, 1970 to H. L. Bowditch et al.; and U.S. Pat. No. 3,047,002 issued July 31, 1962 to H. R. Jaquith. While each of these controllers has proven desirable in its time, significant problems have been common to the art. A major source of complication in the design of process controllers has been the provision of set point and gain adjustment by mechanisms which do not interact with each other and thereby produce artificial disturbances to the process. The provision of indicators of the set point and process variable, which must operate in the process environment, has put additional burdens on controller design. In the past, two known methods have been employed to reduce or remove the interactions that can exist between the input or process variable adjustment mechanism, the gain or proportional band adjustment mechanism, the set point adjustment mechanism, the set point indicator mechanism and the input indicator mechanism. First, interaction has often been minimized by the application of levers, spring rates, and friction points where motions or forces have been summed. This method has often required intricate adjustment and maintenance procedures and has been adversely susceptible to external vibrations. The second method has been the use of pneumatic amplifier systems, which have operated mechanical elements while producing no perceptible load or interactions to their input elements. This style of construction has been commonly used in controllers in control room environments, often referred to as receiver controllers. This method of "pneumatic coupling" has often required extensive development to assure that static and dynamic characteristics could be maintained for all control contingencies. Additional consumption of supply air has also been a negative aspect of this method. The design complexity and maintenance difficulty of either method has resulted in a high purchase price of controllers, and maintenance difficulty.

SUMMARY OF THE INVENTION

A primary object of this invention is to provide an automatic, pneumatic controller of a process variable such as pressure which is improved over prior art controllers.

In particular, objects of the invention are to provide a controller which is suitably rugged for field installation without signal conditioning accessories, facile of maintenance, and highly accurate.

Another object of the invention is a controller in which set point adjustment, input and gain are structurally separated to eliminate artificial effect upon input and gain from set point adjustment.

These and other objects and advantages are achieved by the pneumatic controller of this invention. In principal aspect, the invention is a controller of a process variable comprising a base, a nozzle, a set point lever, a flapper and a process lever. The nozzle is mounted on the set point lever, which is pivotably mounted on the base. The set point lever is for pivoting the nozzle about a set point and input axis in response to a set point adjustment.

The flapper cooperates with the nozzle. The flapper is pivotably mounted on the base for pivotal movement about the set point and input axis. The process lever is connected to the flapper. It pivots the flapper about the set point and input axis in response to the process variable.

In the foregoing aspect, the controller may or may not have feedback or gain mechanisms. In a second pricipal aspect, the controller has the structure of the first aspect, and the flapper is pivotably mounted on the base for pivotal movement about a feedback axis, as well as the set point and input axis. The controller further comprises a feedback lever which is connected to the flapper. The feedback lever pivots the flapper about the feedback axis in response to feedback. The feedback axis is perpendicular to the input and set point axis and preferably passes through a common point.

In a third principal aspect including the structure of the first aspect, the nozzle is pivotably mounted on the set point lever and pivotable about a gain axis in response to a gain adjustment. The gain axis is generally mutually perpendicular with the feedback axis and the input and set point axis, and preferably all axes intersect at a common point.

In all aspects of the invention, the nozzle and set point lever are structurally separated from the flapper, process lever and feedback lever, i.e., no mechanical linkage exists between the structure of the nozzle and set point lever, and the separate structure of the flapper, process lever and feedback lever. As a result, no artificial effect upon the process variable (input) or gain is caused by set point adjustment. The controller is ingeniously uncomplicated, readily suitable for field installation and accurate in use.

BRIEF DESCRIPTION OF THE DRAWING

The preferred embodiment is described in relation to the accompanying drawing, in which:

FIG. 7 is plan view of a flexure pivot assembly of the preferred embodiment; and FIG. 8 is a cross-section view of the flexure pivot assembly, taken along line 8—8 of FIG. 7.

DETAILED DESCRIPTION OF THE PREFERRED EMBODIMENT

Figure 1:
FIG. 1 is a view of the preferred embodiment of the invention as mounted on the actuator of a control valve.
Figure 4:
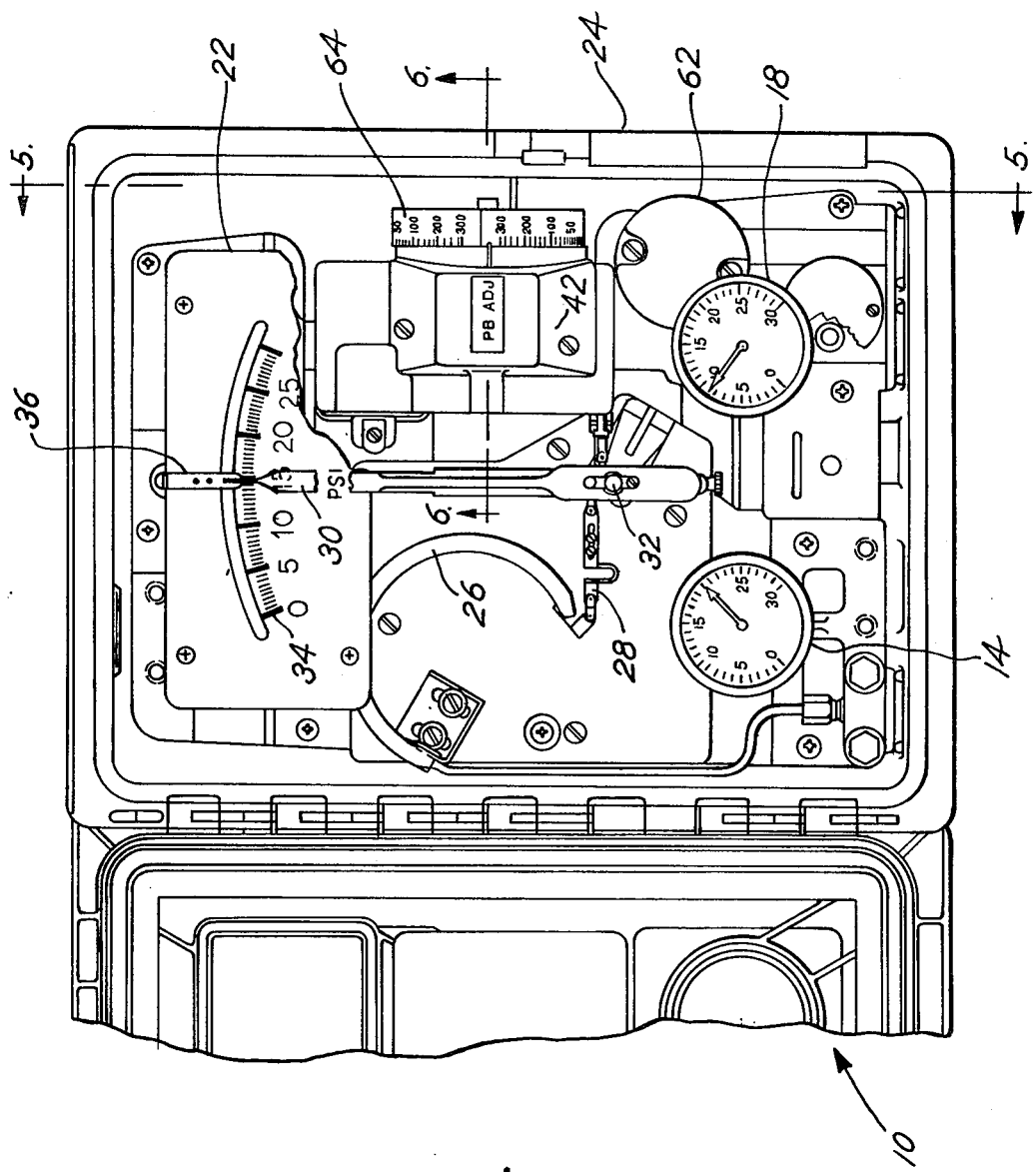
FIG. 4 is an elevation view of the preferred embodiment with its open cover broken away.
Figure 5:
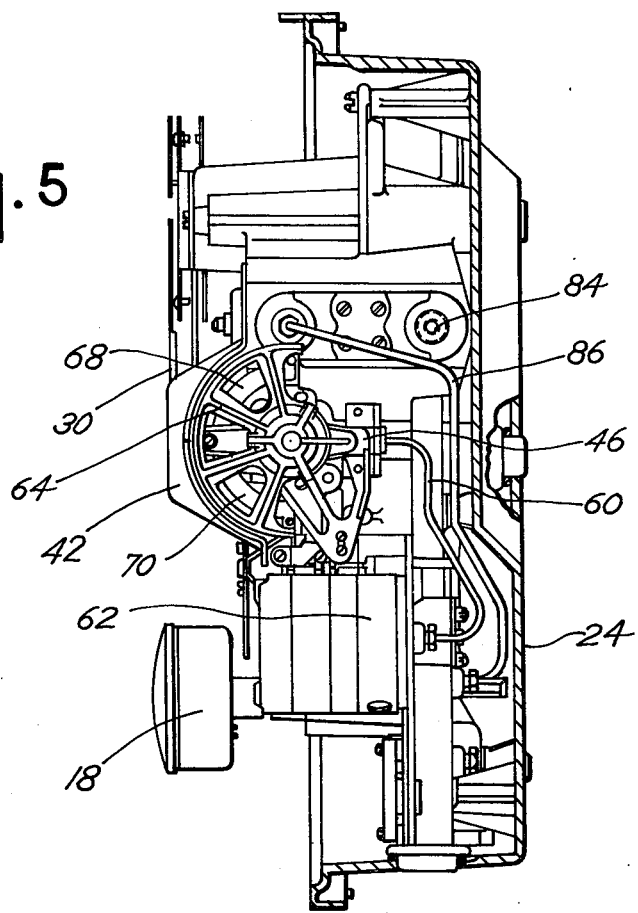
FIG. 5 is a cross-section view taken along line 5—5 of FIG. 4.

Referring to FIG. 1, the preferred embodiment of the present invention is a controller 10. For illustration of one possible adaption, the controller 10 is shown to be yoke-mounted on the actuator of a control valve 12. The vibration resistant design of the controllerr 10 makes it especially suitable for such mounting. The controller may also be mounted on a pipestand, on a wall or in a panel.

Figure 2:
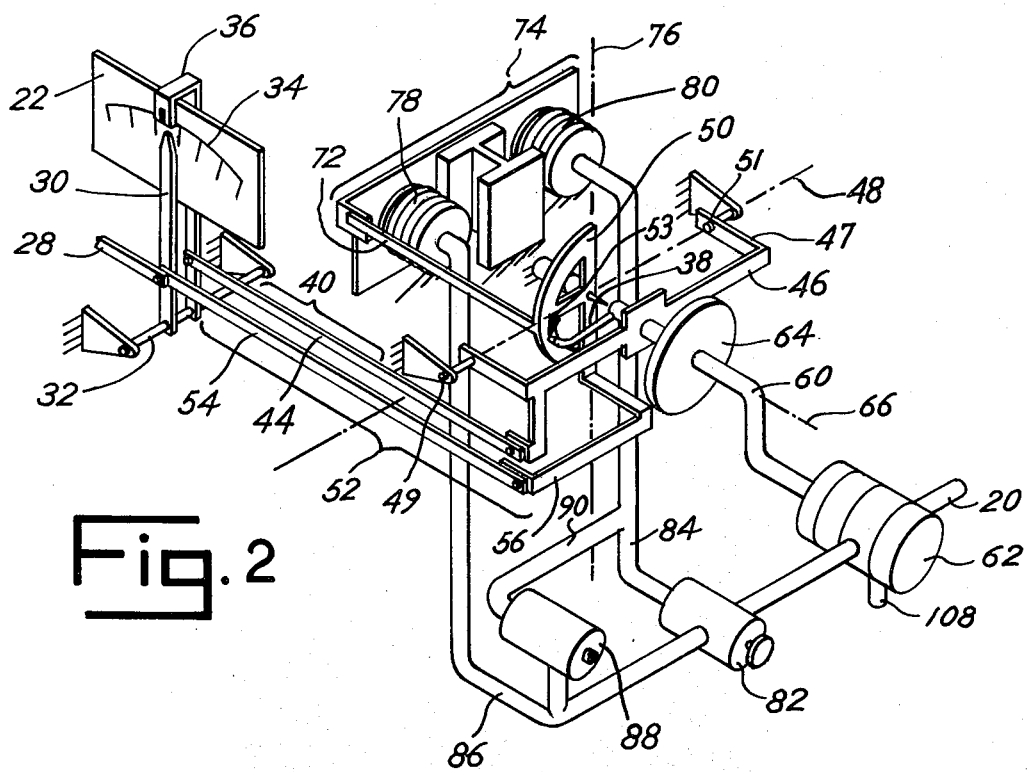
FIG. 2 is a schematic view of the preferred embodiment of the present invention.

As adapted as shown, the controller 10 controls process pressure in the pipeline (not shown) into which the valve 12 is positioned. A gauge 14 reports the pressure of a supply line 108 (FIG. 2) to the controller 10, and gauge 18 reports the pressure of a controller output conduit or line 20 (FIG. 2). A process pressure and set point display 22 reports the operator - adjusted set point and the process pressure. The gauges 14, 18 and display 22, along with all other components of the controller 10, are contained within a housing 24. As most preferred, the housing 24 is a plastic suitable to withstand corrosive environments, as found in chemical plants and on offshore oir platforms. The controller 10 finds use in applications throughout the power, chemical, oil and gas industries, wherever accurate process monitoring and control are required.

As will be described in detail, the controller 10 operates by comparing the process pressure with the operator-adjusted set point, to deliver a pneumatic signal to a control element. This is accomplished so that process pressure changes toward the set point. The controller 10 may be modified for proportional-only control, proportional-plus-reset control, proportional-plus-reset-plus-rate control and differential gap control.

The proportional-plus-reset control modification is shown in FIG. 2, with anit-reset windup. Referring to FIGS. 2 and 4–6, the controller 10 includes an input element 26 such as a Bourdon tube (FIG. 4) connected by an input-element connecting link 18 to a process indicator such as pointer 30. The pointer 30 is mounted upon a dead shaft 32 secured to a base such as the housing 24. This mounting provides for pivoting movement of the pointer 30 about the shaft 32, in response to the driving action of the link 28.

The pointerr 30 cooperates with a scale 34 to report process pressure. Also cooperating with the scale 34 is a set point indicator and actuator such as pointer 36. The pointer 36 is, like the pointer 30, mounted on the dead shaft. Manual adjustment determines the location of the pointer 36. The manual adjustment determines the set point, i.e., the desired pressure of the process under control.

The pointer 36 is linked to a nozzle 38 by a set point linkage 40. (The nozzle is hidden from view in FIG. 4 by a cover 42.) A set point link 44 is connected to the pointer 36 and to a set point lever 46. The lever 46 includes a yoke 47 pivotably mounted at two spaced pivot points 49, 51 to the housing 24, for pivoting about a set point and input axis 48. Manual adjustment of the set point pointer 36 pivots the nozzle 38 through the action of the linkage 40.

The pointer 30 and input connecting link 28 are linked to a flapper 50 by a process linkage 52. (The linkage 52 is also hidden in FIG. 4.) A process beam 54 is connected to the pointer 30 and link 28, and to a first arm or process lever 56 of the flapper 50. The flaperr 50 is mounted to the housing 24 for pivotal movement about the set point and input axis 48, and more specifically, a pivot point 58 (FIG. 3) along the axis 48. As will be described, the pointer 30 and the flapper 50 are driven by the input element 26 through the connecting link 28 and through the linkage 32.

The nozzle 38 and flapper 50 cooperate pneumatically in the usual fashion. The nozzle 38 has a flapper-cooperative opening 53 which is the outlet of a pneumatic line 60 connected by a relay 62 to the output line 20. Proximity of the nozzle 38 to the flapper 50 restricts flow through the nozzle 38 and establishes a pressure in the line 60 increased over that of the nozzle 38 without the flapper 50. Variation of the proximity of the nozzle 38 and flapper 50 causes a variation of the back pressure or nozzle pressure in the line 60. Movement of the nozzle 38 toward the flapper 50, and movement of the flapper 50 toward the nozzle 38, increase pressure in the line 60. Movement of the nozzle 38 and flapper 50 away from each other causes a pressure decrease. This pressure variation is the basis of the process control.

For adjustment of the sensitivity or gain or proportional band of the controller 10, the nozzle 38 is pivotably mounted on the set point lever 46, and a gain indicator and actuator such as a proportional band adjustment 64 is provided. Rotation of the adjustment 64 about a gain axis 66 causes pivoting of the nozzle 38 about the axis 66. The gain axis 66 is perpendicular to the set point and input axis 48.

Figure 3:
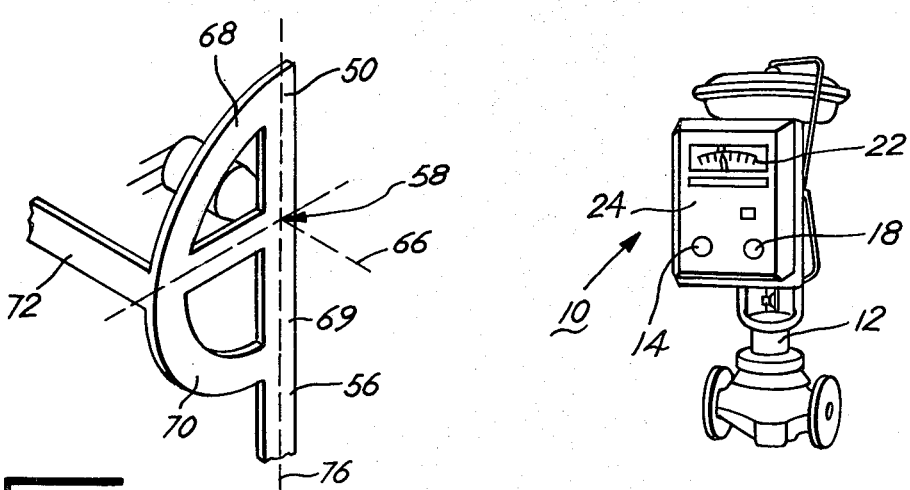
FIG. 3 is a detail of the schematic view of FIG. 2.

As best shown in FIG. 3, the flaperrr 50 is semicircular, and includes a planar nozzle cooperative surface 69 including two quadrants 68, 70. The flapper 50 is pivotable through positions in which the surface 69 parallels and intersects the axis 48. The quadrant 68 is a reverse action quadrant, and the quadrant 70 is a direct action quadrant. Gain is determined by the degree of movement of the nozzle 38 from a position of the nozzle 38 parallel to the axis 48 into either quadrant 68, 70. As will be described, positioning of the nozzle 38 in the direct action quadrant 70 results in an increase in process pressure causing an increase in controller output pressure. Positioning in the reverse action quadrant 68 results in an increase in process pressure causing a decrease in controller output pressure.

In addition to the first arm 56, the flapper 50 has a second arm or feedback lever 72. The arm 72 extends from the quadrants 68, 70 to a feedback mechanism 74. Feedback from the controllerr output is applied to the arm 72 by the mechanism 74, and thereby the flapper 50. The feedback causes pivotal movement of the flapper 50 through a feedback axis 76, which intersects the pivot point 58 and is perpendicular to the set point and input axis 48.

The feedback mechanism 74 includes a proportional bellows 78 and a rest bellows 80. Again, as shown, the controller 10 is modified for proportional-plus-reset control. The bellows 78, 80 are respectively connected to the relay 62 through a reset valve 82 by feedback lines 86, 84. The reset bellows 80 is also connected to the reset valve 82 through a relief valve 88 by a releif line 90. For proportional only control, the lines 84, 86 and valves 82, 88 may be eliminated, and the reset bellows 80 vented. Similar changes may be made for the other types of control.

Figure 6:
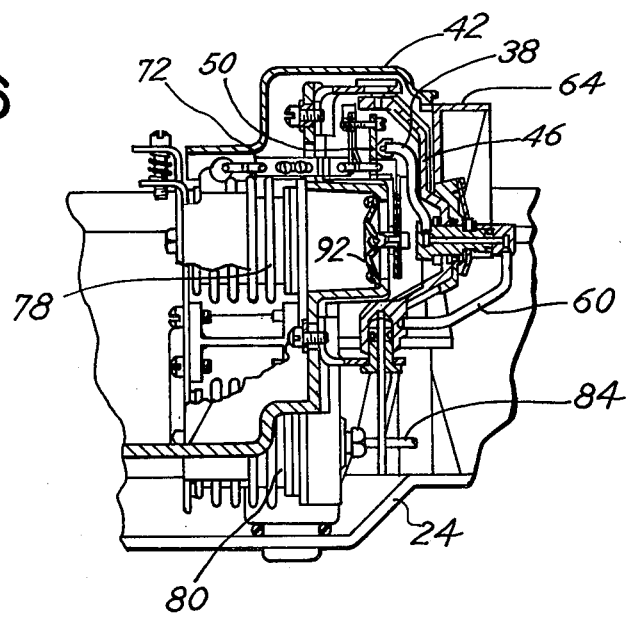
FIG. 6 is a cross-section view taken along line 6—6 of FIG. 4.

Pivotal movement of the flapper 50 about the pivot point 58 is provided by a flexure pivot assembly 92, as shown in FIGS. 6, 7 and 8. The assembly 92 includes a retainer 94 mounted to the housing 24. A ball bearing 96 is centrally mounted between the retainer 94 and a flexure subassembly 98, at the pivot point 58. A trifurcated flexure member 100 of the subassembly 98 includes an annular arrangement of circumferentially extending and radially interconnected byzantine flexure elements 102. The elements 102 join an outer rim 104 of the member 100 to a flapper support 106. The rim 104 is joined to the retainer 94, and the flapper support 106 is mounted against the ball bearing 96. Freedom of movement of the flapper 50 about the point 58, with support and retention, are provided by the elements 102 and the bearing 96.

As so constructed, the controller operates as follows. Manual selection of set point and gain are made by adjustment of the set point pointer 36 and the proportional band adjustment 64. Input from the process is supplied to the controller 10 by the input element 26, and supply pressure is provided to the controller 10 through a supply line 108 into the relay 62. The manual adjustment of the set point lever 36 and the adjustment 64 determine an initial location of the nozzle 38. With the nozzle located in the quadrant 70, the controller 10 is a direct-acting controller. Thus, as the process pressure increases, the link 28, pointer 30, linkage 52 and flapper 50 are moved, to the right as seen in FIG. 2. The flapper 50 moves toward the nozzle 38, restricting flow through the nozzle 38 and increasing pressure in the line 60. The output pressure of the controller 10 at line 20 is increased. This increase is fed to the bellows 78, 80 by the lines 86, 84, 90. The proportional bellows 78 responds to the increased pressure by expanding, and moving the flapper 50 away from the nozzle 38. The reset bellows 80 responds by expanding and moving the flapper 50 toward the nozzle 38. These actions counter the flapper movement that resulted from the process pressure change. Together, the actions result in a variation of the output pressure. Absent further independent process pressure fluctuations, process pressure wil become substantually equal to the set point pressure.

With the nozzle 38 located in the quadrant 68, the controller 10 is a reverse-acting controller. An increase in process pressure causes a decrease in output pressure, with the components of the controller 10 responding accordingly.

The preferred embodiment of the inventon has now been described in detail. As should be understood, a variety of changes may be made to the preferred embodiment without departing from the subject matter regarding as invention. Therefore, the following claims are appended to particularly point out and distinctly claim the subject matter regarding as invention.

We claim:

1. A pneumatic controller for controlling a process variable comprising:
   a base;
   a nozzle;
   a set point lever on which the nozzle is mounted, the set point lever being pivotably mounted on the base for pivoting the nozzle about a set point and input axis in response to a process variable set point adjustment;
   a flapper pneumatically cooperating with the nozzle and pivotably mounted on the base for pivotal movement about the set point and input axis and about a feedback axis;
   a process lever connected to the flapper for pivoting the flapper about the set point and input axis in response to the process variable; and
   a feedback lever connected to the flapper for pivoting the flapper about the feedback axis in response to feedback.

2. A pneumatic controller as in claim 1 in which the set point lever and the nozzle are structurally separated from the process lever, the feedback lever and the flapper.

3. A pneumatic controller as in claim 1 in which the set point lever and the nozzle are operationally linked to the process lever, the feedback lever and the flapper only through pneumatic cooperation of the nozzle and the flapper.

4. A pneumatic controller as in claim 1 in which the set point lever and the nozzle are structurally separated from the process lever, the feedback lever and the flapper, and in which the set point lever and the nozzle are operationally linked to the process lever, the feedback lever and the flapper only through pneumatic cooperation of the nozzle and the flapper such that pivoting of the set point lever and the nozzle does not affect the process lever, the feedback lever and the flapper, pivoting of the flapper resulting only from a change of the process variable applied to the flapper through the process lever and from feedback applied to the flapper through the feedback lever.

5. A pneumatic controller as in claim 4 in which the set point and input axis and the feedback axis intersect at a point, and in which the flapper is pivotably mounted for pivotal movement about the point relative to the set point and input axis and the feedback axis.

6. A pneumatic controller as in claim 5 in which the nozzle is located proximally to the flapper and further comprising a pneumatic output conduit coupled to the nozzle, the nozzle and the flapper cooperating to provide a controller output signal in the pneumatic output conduit which varies according to the spacing between the nozzle and the flapper as the flapper is pivoted about the point responsive to changes in the process variable and the feedback.

7. A pneumatic controller as in claim 6 in which the nozzle is pivotably mounted on the set point lever for pivoting about a gain axis in response to a gain adjustment, the gain of the pneumatic controller being adjusted by pivoting the nozzle about the gain axis to change the nozzle location relative to the set point and input axis and the feedback axis.

8. A pneumatic controller as in claim 7 in which the set point and input axis, the feedback axis and the gain axis all intersect at the point about which the flapper is pivotable.

9. A pneumatic controller as in claim 8 in which the set point and input axis and the feedback axis are substantially perpendicular.

10. A pneumatic controller as in claim 6 in which the set point lever includes a yoke pivoted about the set point and input axis, in which the nozzle is mounted on the yoke, and further comprising a gain indicator and actuator coupled to the nozzle for indicating and adjusting the gain of the pneumatic controller.

11. A pneumatic controller as in claim 10 further comprising a set point indicator and actuator linked to the yoke for indicating and adjusting the process variable set point, the set point being changed by manually adjusting the set point indicator and actuator to pivot the yoke about the set point and input axis to change the nozzle spacing from the flapper.

12. A pneumatic controller as in claim 11 further comprising a process indicator linked to the process lever for indicating the process variable.

* * * * *

UNITED STATES PATENT AND TRADEMARK OFFICE
CERTIFICATE OF CORRECTION

PATENT NO. : 4,453,559

DATED : June 12, 1984

INVENTOR(S) : Gerald F. Varnum and David E. Wiklund

It is certified that error appears in the above-identified patent and that said Letters Patent is hereby corrected as shown below:

Column 2, line 15, delete "pricipal" and substitute --principal--.

Column 2, line 68, delete "controllerr" and substitute --controller--.

Column 3, line 16, delete "oir" and substitute --oil--.

Column 3, line 32, delete "18" and substitute --28--.

Column 3, line 59, delete "flapperr" and substitute --flapper--.

Column 3, line 65, delete "32" and substitute --52--.

Column 4, line 39, delete "controllerr" and substitute --controller--.

Column 4, line 46, delete "rest" and substitute --reset--.

Column 5, line 29, delete "wil" and substitute --will--.

Signed and Sealed this

Ninth Day of April 1985

[SEAL]

Attest:

DONALD J. QUIGG

*Attesting Officer*   *Acting Commissioner of Patents and Trademarks*